F. STEVENS.
LIQUID FUEL BURNER.
APPLICATION FILED MAY 17, 1918.

1,326,146.

Patented Dec. 23, 1919.
2 SHEETS—SHEET 2.

WITNESSES:
G. J. Martin.
G. L. Milligan.

Frank Stevens.
INVENTOR

ATTORNEY

UNITED STATES PATENT OFFICE.

FRANK STEVENS, OF PHILADELPHIA, PENNSYLVANIA.

LIQUID-FUEL BURNER.

1,326,146.  Specification of Letters Patent.  Patented Dec. 23, 1919.

Application filed May 17, 1918. Serial No. 235,211.

*To all whom it may concern:*

Be it known that I, FRANK STEVENS, a citizen of the United States, residing at Philadelphia, in the county of Philadelphia and State of Pennsylvania, have invented a new and useful Improvement in Liquid-Fuel Burners, of which the following is a specification.

My invention relates to burners adapted for the combustion of the heavy oils or hydro-carbons, as for example crude petroleum and the principal objects thereof are to afford efficient means for breaking up or atomizing and vaporizing the fuel, to direct thereinto a powerful draft of air to support substantially perfect combustion and to charge air drafts with chemical substances in vapor form, as for example water vapor.

I attain these objects in the apparatus described in the following specification and shown in the accompanying drawings, in which—

Figure 1:
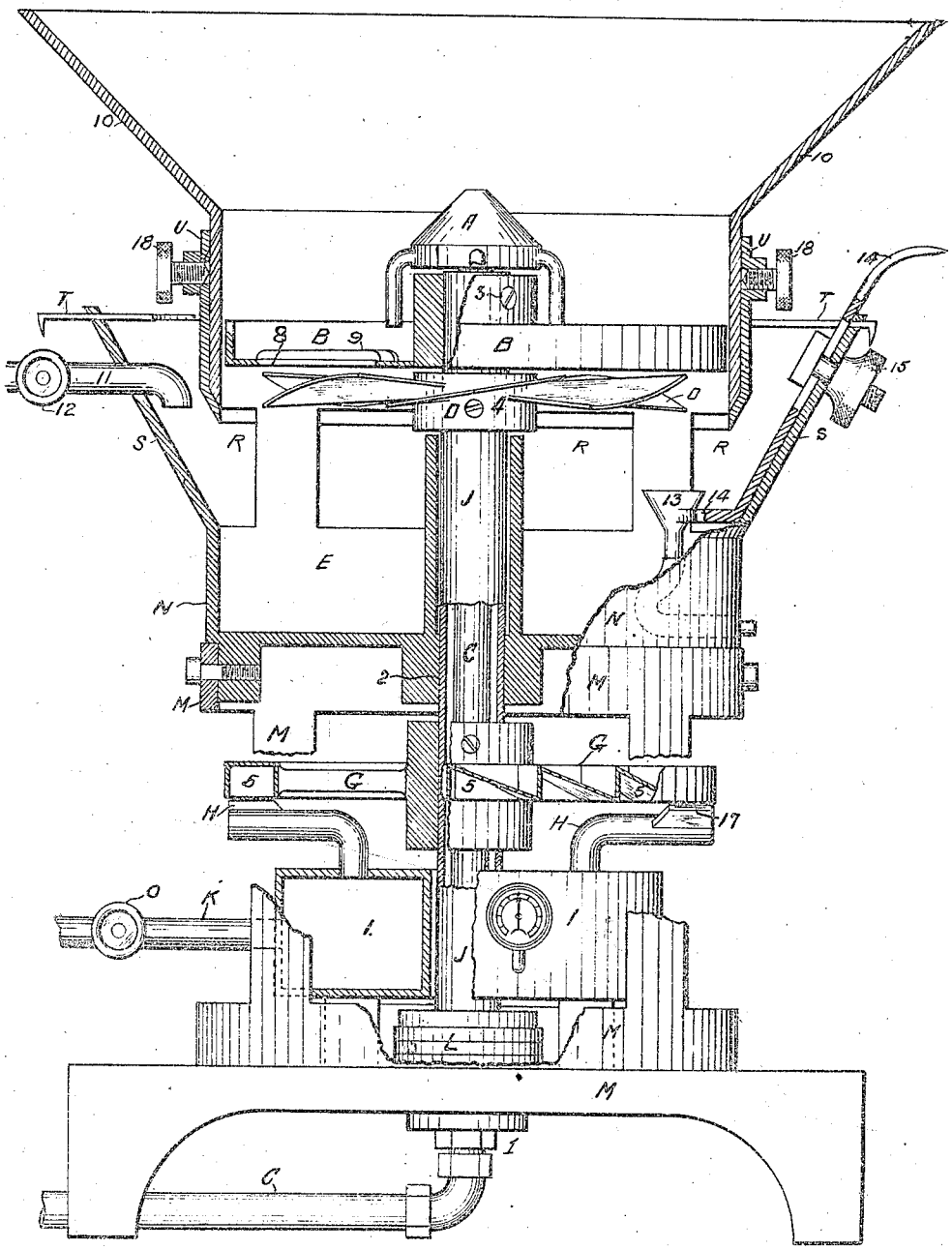
Figure 2:
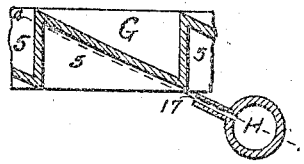
Figure 3:
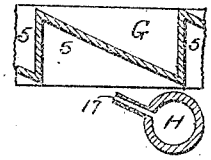
Figure 4:
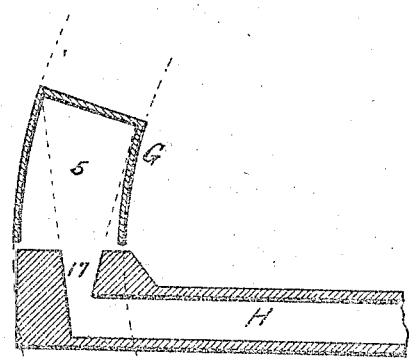
Figure 5:
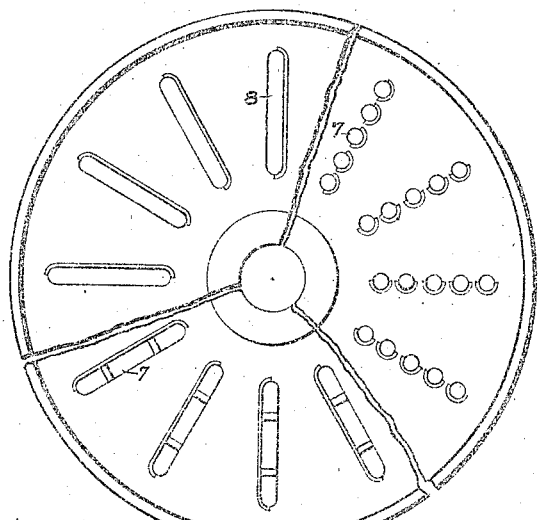

Figure 1 is a vertical section of the complete apparatus with certain parts broken away to facilitate explanation; Fig. 2, a vertical detail section view showing the angular relations of the air-jets and pockets; Fig. 3, a similar view of the same in a different position; Fig. 4, a detail plan view of the same, showing the nozzle in section; and, Fig. 5, a plan view of the rotatable bed plate.

Similar index characters refer to similar parts throughout the several views.

Broadly speaking my invention, as shown herein embodied, consists in the following major parts:—

A fountain or fuel supply, A, located above and concentric with a rotatable bed-plate, B;

A perforated rotatabe bed-plate, B, central with the supply pipe C;

A fan, D, concentric with disk B and mounted on the same drive shaft, G, so as to rotate therewith;

A tank, E, to contain a chemical component and positioned, with relation to the means for supplying atmospheric air, to interpose broad surface of this component into contact with the influx of air caused by the fan;

A rotatable drive-wheel, G, fast to the shaft carrying the fan D and disk or bed-plate B, and provided with air-pockets, annularly disposed, adjacent to its circumference;

Inclined nozzles H, adapted to direct jets of compressed air into the air-pockets;

A reservoir communicating with said nozzles and in which uniform pressure is maintained, including supply and control means therefor;

A central tubular drive shaft, J, to which the drive-wheel or disk G, the fan D and the bed-plate B are fast;

A vertical, rigid fuel supply pipe, C, within said tubular shaft and supporting the fountain A; and, A suitable housing including means for controlling the admission of atmospheric air.

An examination of the views will disclose the fact that the general combination and arrangement of these elements afford simplicity of operation, perfect accessibility, and ready control over the forces employed.

The relationship between the inclined walls of the air-pockets and the inclination of the nozzles, as well as the form thereof, will be referred to in the following detailed description of the construction and operation.

For the purposes of illustrating my invention I have shown in the accompanying views and herein described the form thereof at present preferred by me, although it is to be understood that the various instrumentalities of which my invention consists can be variously arranged and organized, and that my invention is not to be limited to the precise arrangement and organization herein shown and described, and that I hereby reserve the right to re-organize and re-arrange these instrumentalities within the scope of my invention.

In the specific construction shown in this application, the apparatus is housed in a two-piece standard formed of a base, M, and an upper casing, N, preferably cylindrical in form.

The fuel supply pipe C is introduced from beneath through a suitable retaining jointure, 1, located at the center of the base M, and extends vertically therefrom to the fountain A near the open top of the upper casing N. The bearing L, through the axis of which this pipe must extend, is centrally secured to the base M. In this bearing is fitted to rotate the lower extremity of a tubular drive shaft, J, which has also a suitable secondary and guide bearing, 2, herein shown as an integral part of the casing N. This shaft terminates at the top of the rotatable bed-plate C, which is suitably secured thereto, as by a set screw, 3, and, being hollow, serves as a channel through which the supply pipe C connects with its fountain A. Of course, there is no contact anywhere between the rotatable tubular shaft and this insheathed pipe, which stand rigid and immovable in the vertical axis of the apparatus. Also secured, as at 4, to the shaft J and immediately beneath the plate B, is the fan or blower D which is in consequence rotated in unison with the plate.

Within the base M and adjacent to the bearing L is located the compressed-air chamber I, annular in form to permit of free rotation, within its center, of the shaft J. The air is furnished and maintained as desired through a pipe K, connected with any suitable compressor and automatic control mechanism, the particulars and operation of which are so well understood as to require neither explanation nor illustration.

Extending from the reservoir I are the jet-forming nozzles H, adapted to cause expanding air jets to enter into and impinge upon the substantially vertical walls of the pockets 5, which are arranged in a series near the circumference of the driving disk G. These jet-formers may be as numerous as desired; two are here shown diametrically opposite each other. The number of pockets is also optional, judgment being used to employ a number thereof so related to the number of nozzles that there may be no "dead point" at starting. That is, the relation between the positions of the nozzles and the pockets is such that, no matter where the drive disk G may happen to come to rest, there will be, at least, one pocket in favorable re-starting relation with a nozzle, as shown in Fig. 2. The disk G, being the motor, is secured to the drive shaft C, as by set screw 6. It is clear that by the use of the cock O, which may be located at any convenient point in the compressed air system, the pressure within the chamber or reservoir, I, may be controlled and maintained as desired, and indicated by a gage P. Thus, power as required to afford any desired speed of rotation of the shaft J and its appurtenances may be supplied controlled and maintained.

The base-plate B, except within a small circular space at the center and a narrow zone adjacent to the circumference is provided with numerous perforations, either in the form of holes 7, or radial slits 8. Adjacent to each such orifice and, with relation to the direction of rotation of the plate, at the rear thereof, is formed a vertically extending wing or fin. The effect of this conformation of the upper surface of the plate B is to produce suitable contact, and bring about a thorough mixing, of the air-blasts through the orifices with the fuel supplied from above by the fountain A, when the disk is revolved with speed relations suitable to the quantity and character of the fuel employed.

The combustion chamber is thus formed by this rotatable disk or plate, B, and the circular wall of the casing N, the upper stretch of which is flared, as shown at 10.

Formed in the casing is a container E to afford the water moisture of other chemical factor desired to be introduced. It is annular in form, having an inner concentric wall, 19, to provide accommodation for the free rotating space of the central drive shaft J. Also formed in the casing N, just above and extending around the tank, is a series of large openings R, to afford a copious supply of atmospheric air, which, through the action of the blower, is drawn into the casing from all sides. This formation is also designed with a view of directing the incoming air into such proximity with the combustion chamber that its temperature will be raised to aid the vaporization of the contents of the container. Therefore, adjacent to these openings, secured to and surrounding the casing, and acting as a funnel F, is the flared member S, adapted to form a channel that will direct the air immediately about the exterior of the combustion chamber where it is so greatly heated immediately before being drawn into such intimate and direct contact with a broad area of the chemical component as to result in the rapid vaporization thereof in ample volume. This funnel is provided with a cover composed of several independently movable sections, T, so as to afford adjustable damping means. There is a supply pipe, 11, a cock, 12, and an adjustable overflow, 13, for the container, so that any desired depth, or height of fluid may be maintained and any escape or dripping of the fuel finding lodgment on the surface may be carried away. The overflow is attached to a support, 14, adjustably connected to the casing N as at 15 on member S. It is also provided with the flexible drain tube, 16, to permit of adjustment.

Referring to Fig. 4 it will be observed that the air-jet channel 17 is substantially trapezoidal in form, with the narrow side at the entrance from the pipe and the wide side at the exit for the air. This figure is so proportioned as to produce a jet exactly equal in scope to the width of the inverted pockets, 5, at their greatest depth. From Figs. 2 and 3, it is seen that the angle of the hypotenuse of each pocket corresponds precisely with the angle of the direction of force of each air-jet. I have found that the most efficient angle, with relation to speed at any given pressure, lies between 15° and 25°.

Encircling the casing N, above the large openings R is the movable circular band U, adapted to be raised and lowered and set at various heights so as to regulate the openings and thus guide the inflowing air to the surface of the chemical at various heights in the container E. When placed as required by existing conditions, this band is secured, as by set screws, 18. This construction, in conjunction with drain-level control, affords the user great latitude in regulating the space between the blower and the chemical, as well as in directing the incoming draft thereto. In fact, the system comprising the covers T, the adjustable band U and the chemical level control means coordinating with the speed control, provides ample means for adapting the apparatus for the most efficient and complete combustion of any of the various grades of liquid fuels.

I have found that vapor, in suitable proportions, from ordinary substantially pure water, not to mention various chemical combinations and solutions, is most efficient in enhancing combustion and, consequently, in preventing or removing carbon deposit, in the use with certain fuels. However, my invention is designed to be effective in any case, irrespective of the precise character of the chemical employed.

The operation and action of my invention is as follows: The fuel supply cock being opened, the oil from the fountain is ignited. After a brief interval of time, the air-valve O is opened whereupon the fan and the perforated base-plate B start to rotate. The character of the fire produced will under any given set of conditions, vary with the character of the fuel. It is then merely a question of regulating the several instrumentalities just described until the combination of conditions affording perfect combustion is attained. Experience with varying grades and qualities of fuel, and the quantity of consumption, must determine the speed factor, the vapor factor and the air factor. Whatever these various combinations may be found to be, once known to the operator, they may be produced by the appropriate manipulation of the control means above explained. For example, the rate of consumption necessary for the result to be attained and the character of the fuel being known, the air-gage P, indicating the pressure, will be held at the proper mark to produce the speed desired for the blower and perforated plate, the damper-covers T, will be set to supply the required volume of air, the proximity of the chemical contents of the container to the blower regulated and fixed by the adjustment of cock 12 and overflow 13, and the atmospheric air flow, further regulated and the direction thereof, with relation to the chemical in the container, by the adjustment of the band U. It is, therefore, obvious that whatever combination of factors may be best adapted to the complete combustion, at any desired rate, of any given fuel, ideal conditions in this respect may be reached through the instrumentalities herein assembled.

Having thus described and illustrated one form of apparatus embodying my invention, I claim—

1. In a device of the character described, in combination, a fuel fountain, a perforated plate rotatable thereabout, a draft creating fan, means to interpose a chemical substance in the draft thereby produced, means to regulate and control the volume of said draft and means to rotate said plate and said fan.

2. In a device of the character described, in combination, a fuel fountain, a perforated plate rotatable thereabout, a draft creating fan, means to interpose a chemical fluid in the draft thereby created, means to regulate the proximity of said fluid to said fan, means to regulate and control the volume of said draft and means to rotate said plate and said fan.

3. In a device of the character described, in combination, a fuel fountain, a perforated plate rotatable thereabout, a draft creating fan, means to interpose a chemical in the draft thereby produced, means to alter the position of the chemical with relation to said draft and means to rotate said plate and said fan.

4. In a device of the character described, in combination, a fuel fountain, a perforated plate rotatable thereabout, artificial draft creating means, means to interpose a chemical substance in the draft thereby produced, means to variously alter and restrict the area of contact of said draft with said chemical and means to rotate said plate.

5. In a device of the character described, in combination, a fuel fountain, a perforated plate rotatable thereabout, artificial draft creating means, means to interpose a chemical in the draft thereby produced, means to regulate and control the volume of said draft, means to variously alter the position of the chemical with relation to the draft and means to rotate said plate.

6. In a device of the character described, in combination, a fuel fountain, a perforated plate rotatable thereabout, artificial draft creating means, means to interpose a chemical in the draft thereby produced, means to regulate and control the volume of said draft, means to variously alter and restrict the area of contact of said draft with said chemical and means to rotate said plate.

7. In a device of the character described, in combination, a fuel fountain, a perforated plate rotatable thereabout, artificial draft creating means, means to interpose a chemical in the draft thereby produced, means to regulate and control the volume of said draft, means to variously alter and restrict the area of contact of said chemical with said draft, means to alter the position of said draft with relation to said chemical and means to rotate said plate.

8. In a device of the character described, in combination, a fuel fountain, a perforated plate rotatable thereabout, a draft creating fan, means to interpose a chemical substance in the draft created thereby, means to regulate and control the volume of said draft, means to alter and restrict the area of contact of said draft with said chemical, means to alter the proximity of said chemical to said fan and means to rotate said plate and said fan.

9. In a device of the character described, in combination, a fuel fountain, a perforated plate rotatable thereabout, means for creating artificial draft, air channels leading to said means and including a container for chemical matter, means for maintaining various constant levels for chemicals therein altering the position of said container with relation to said draft-creating means, and means to rotate said plate and to operate said draft-creating means.

10. In a device of the character described, in combination, a fuel fountain, a perforated plate rotatable thereabout, means for creating artificial draft, air passages, including a retainer for chemical matter, leading to said means, means to regulate and control the volume of said artificial draft and means to rotate said perforated plate and to operate said draft creating means.

11. In a device of the character described, in combination, a fuel fountain, a perforated plate rotatable thereabout, means for creating artificial draft, air passages, including a container for chemical matter, leading thereto, means for variously altering the position of chemical matter in said container with relation to said draft-creating means, means to regulate and control the volume of draft so created and means to rotate said perforated plate and to operate said draft-creating means.

12. In a device of the character described, in combination, a fuel fountain, a perforated plate rotatable thereabout, a blower, a container for chemicals, adjacent thereto, air passages leading into said container, means for variously limiting the flow of air therein, means for variously limiting the size of the junctions of said passages with said container, means for variously altering the distance between said blower and chemicals in said container and maintaining any such altered distance, and means to rotate said plate and said blower.

13. In a device of the character described, in combination, a fuel fountain, a perforated plate rotatable thereabout, a wing partially bordering each perforation in said plate, a blower, a shaft to rotate said plate and said blower, a drive wheel on said shaft, a series of triangular pockets annularly disposed in said wheel, nozzles so inclined as to project air-streams into said pockets in a plane parallel with a side thereof, an air reservoir to supply said nozzles, and means to maintain various desired pressures within said reservoir.

14. In a device of the character described, in combination, a fuel fountain, a perforated plate rotatable thereabout, a wing partially bordering each perforation in said plate, a blower, a shaft to rotate said plate and said blower, a drive wheel on said shaft, a series of triangular pockets annularly disposed in said wheel, a reservoir for compressed air, means to maintain therein various degrees of pressure, nozzles extending from said reservoir and directed toward said series of pockets, and a channel in each nozzle so formed as to project a stream of air of an ultimate width exactly equal to the width of said pockets.

15. A burner for liquid fuel furnace comprising a combustion chamber, having a rotatable perforated bottom, a fuel fountain within said chamber, a rotatable fan beneath said bottom, a container for chemicals beneath said fan, means for maintaining various desired distances between said fan and the contents of said container, and means to rotate said bottom and said fan.

16. A burner for liquid fuel furnace comprising a combustion chamber having a rotatable perforated bottom, a fuel fountain within said chamber, means for forcing a draft through said perforations, means for charging said draft with a chemical substance, means for raising the temperature of said draft before so charging it, and means for rotating said perforated bottom at various maintained speeds.

17. A burner for liquid fuel furnace comprising a combustion chamber having a rotatable perforated bottom, a fuel fountain in said chamber, a rotatable fan beneath said bottom, a receptacle beneath said fan, means to maintain various desired distances between said fan and the contents of said receptacle, air channels leading to said receptacle, means for regulating the flow of air therein, means for raising the temperature of the air so flowing before it enters said receptacle and means to rotate said fan and said bottom.

18. A burner for liquid fuel furnace comprising a combustion chamber having a rotatable perforated bottom, a fuel fountain in said chamber, a rotatable fan beneath said bottom, a receptacle beneath said fan, means to maintain various desired distances between said fan and the contents of said receptacle, air channels leading to said receptacle, means for regulating the flow of air therein, means for raising the temperature of the air so flowing before it enters said receptacle, means for limiting the size of said channels at their junction with said receptacle, a shaft to rotate said bottom and said fan, a drive disk on said shaft, a series of triangular pockets annularly disposed about said disk, nozzles so inclined as to project air-streams into said pockets in a plane parallel with a side thereof, a channel in each of said nozzles so modeled as to form a stream of an ultimate width exactly equal to the width of said pockets, a compressed air chamber with which said nozzles communicate, and means to maintain various desired pressures within said chamber.

FRANK STEVENS.

Witnesses at signing:
ALBERT S. WAY,
JOHN P. CONEYS.